Dec. 31, 1968     C. D. ROBERTS     3,418,794
FURNACE FILTER WITH REPLACEABLE FILTER ELEMENT
Filed Dec. 21, 1966
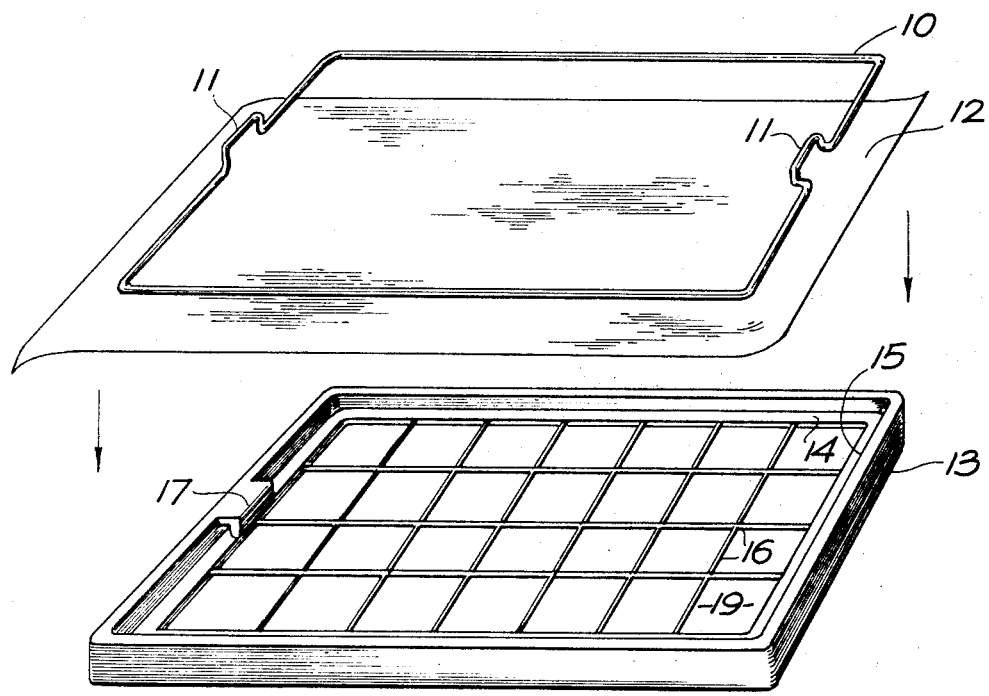
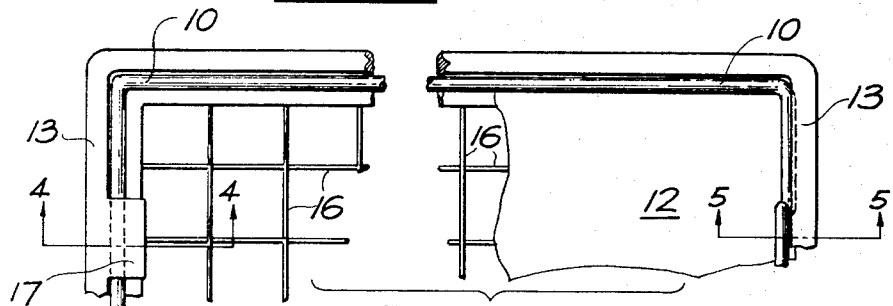
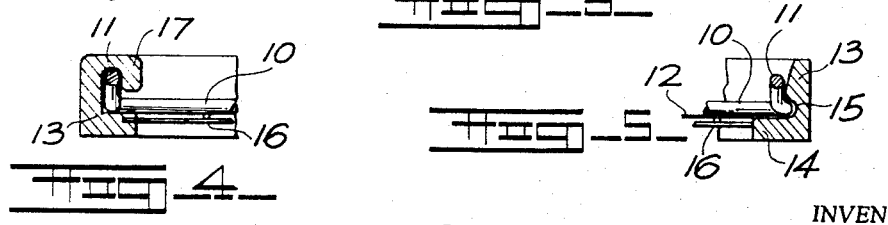
INVENTOR.
Charles Doria Roberts
BY
W. B. Harpman
ATTORNEY.

United States Patent Office 3,418,794
Patented Dec. 31, 1968

3,418,794
FURNACE FILTER WITH REPLACEABLE FILTER ELEMENT
Charles Doria Roberts, 5754 Youngstown Poland Road, Youngstown, Ohio 44514
Filed Dec. 21, 1966, Ser. No. 603,662
1 Claim. (Cl. 55—501)

ABSTRACT OF THE DISCLOSURE

A furnace filter with a replaceable filter element consisting of a rectangular frame having an integral air previous grid, the frame and grid being formed of synthetic resin and molded in one piece, the grid spanning the area defined by the frame and being integral with the frame, the frame having an inturned flange, a replaceable section of air pervious sheet filter material disposed on said grid and overlying the inturned flange, and a rectangular wire clamping member of a size registrable within the frame and against the inturned flange, the frame having a longitudinally extending groove in the inner surface thereof, the wire clamping member having offset upturned sections in the opposite end portions thereof, the rectangular frame having a bracket with an inturned and downturned section registering over one of the offset sections on the wire clamping member and resiliently retaining said wire clamping member in a position holding the section of sheet filter material in position in the frame and on the grid.

---

This invention relates to a filter for a warm air furnace of the forced air type, and wherein the air delivered to the furnace for heating is passed through a filter to remove dirt and dust particles therefrom. The furnace filter disclosed herein comprises a suitable supporting and clamping framework arranged to receive and retain a filter element in the form of a porous sheet capable of passing air and filtering out objectionable dirt and dust particles therefrom. The filter sheet is preferably formed of paper which may be treated, and it may be formed of fibers of organic and inorganic materials with suitable binders, again forming a suitable air filtering medium. Such a sheet filter may obviously be supplied in rolls similar to rolls of paper towels, and is capable of being easily unrolled and a section thereof positioned in the holding and clamping device and the same positioned in the air inlet of a furnace, where it effectively serves as an air filter.

The principal object of the invention is the provision of a furnace filter utilizing a sheet of porous filtering material held in appropriate workable position by a supporting and clamping frame. A still further object of the invention is a provision of a furnace filter that may be inexpensively formed and readily substituted for the treated fiber glass filters now commonly used in warm air furnaces. A still further object of the invention is a provision of a furnace filter that may be largely formed of inexpensive molded plastic filter supporting and positioning means together with a wire clamping frame, and a section of a porous paper-like filter element secured in said assembly.

The furnace filter disclosed herein comprises a simple and efficient replacement for conventional warm air furnace filters heretofore known in the art. In the present invention a simple frame-like construction with appropriate transverse supporting members receives a section of filter paper, or the like, and the same is held therein by a wire clamping frame. The assembly is then positioned in the warm air furnace in the cold air intake and acts as a filter and it may be removed and the sheet of filter element readily and inexpensively replaced from time to time.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a sheet of porous filter sheet and a clamping ring positioned thereover.

FIGURE 2 is a perspective view of a filter receiving frame having transverse support means.

FIGURE 3 is a top plan view of a portion of the furnace filter, showing in the left half thereof a portion of the filter receiving and holding device and the clamping ring, and in the right-hand portion thereof the same construction with a section of the filter sheet in position thereon.

FIGURE 4 is a cross-section on line 44 of FIGURE 3, and FIGURE 5 is a cross-section on line 55 of FIGURE 3.

By referring to the drawings and FIGURES 1 and 2 in particular, it will be seen that a rectangular wire clamping member 10 is shown, and is provided at its opposite ends with upturned offset handle-like sections 11—11. In FIGURE 1 the clamping member 10 is shown positioned over a section of sheet-like filter material 12 which may be, and preferably is, a suitable porous paper product that will filter impurities from air moved therethrough, as in a warm air furnace. In FIGURE 2 of the drawings a rectangular frame is disclosed and it will be seen to comprise an integral molded synthetic resin rectangular frame 13, having an inturned flange 14, and a shallow longitudinally extending groove 15 on its inner surface. A grid 16, is formed integrally with the rectangular frame 13, extends across the rectangular area defined by the frame 13, and more specifically the inturned flange 14 thereof, and provides a suitable support for the sheet filter 12, as seen in FIGURE 1. The sheet filter 12 is preferably of a size so that it will fit in the area within the vertical portion of the frame 13 and on the inturned flange 14 thereof, so that when the wire clamping member 10 is moved into position as hereinafter described, the filter sheet 12 will be held on the inturned flange 14 and supported by the grid 16.

In order that the wire clamping member 10 can be tensioned relative to the frame 13 and the filter sheet 12 positioned therein, it is provided at its opposite ends with the upturned offset sections 11—11 heretofore referred to and the frame 13 is provided with an inturned and downwardly extending bracket 17 on one end thereof, as best seen in FIGURES 3 and 4 of the drawings. The wire clamping member 10 is of a size so that it will fit snugly in the frame 13 and will normally register partly within the shallow longitudinally extending groove 15 therein, which is just above the inturned flange 14. In such position with one of the upturned offset portions 11 and under the bracket 17, the wire clamping member 10 will hold the filter sheet 12 firmly in position on the flange 14, where it will also be supported by the grid 16. The overall size and shape of the frame 13 with the filter sheet 12 and the wire clamping member 10 therein, corresponds with the size and shape of the throw-away fiber glass filter elements now commonly used in warm air furnaces, and the device may obviously be made in various sizes so as to fit the various furnaces as required.

It will thus be seen that a simple and efficient warm air furnace filter has been disclosed which makes use of a readily replaceable sheet filter element which can be conveniently supplied in rolls and thus quickly and easily used in replacing the actual filter element.

What I claim is:

1. A furnace filter with a replaceable filter element consisting of a rectangular frame having an integral air pervious grid, said frame and grid being formed of synthetic resin and molded in one piece, the grid spanning the area defined by said frame, and being integral with said frame, said frame having an inturned flange, a replaceable section of air pervious sheet filter material disposed on said grid and overlying said inturned flange, and a rectangular wire clamping member of a size registrable within said frame and against said inturned flange, said frame having a longitudinally extending groove in the inner surface thereof, said wire clamping member having offset upturned sections in the opposite end portions thereof, said rectangular frame having a bracket with an inturned and downturned section registering over one of said offset sections on said wire clamping member and resiliently retaining said wire clamping member in said groove in said frame in a position holding said section of sheet filter material in position in said frame and on said grid.

References Cited

UNITED STATES PATENTS

| | | |
|---|---|---|
| 1,104,151 | 7/1914 | Stein. |
| 1,771,173 | 7/1930 | Greene _____ 55—483 X |
| 2,182,501 | 12/1939 | Quave et al. |
| 2,209,741 | 7/1940 | Sullivan et al. |
| 2,335,428 | 11/1943 | Lofgren _____ 55—493 X |
| 2,783,834 | 3/1957 | Brame. |
| 2,895,565 | 7/1959 | Le Brun et al. _____ 55—509 X |
| 2,964,127 | 12/1960 | Korn _____ 55—509 X |
| 3,076,303 | 2/1963 | Durgeloh _____ 55—511 |
| 3,111,489 | 11/1963 | Getzin. |
| 3,150,945 | 9/1964 | Baggeson _____ 55—493 |
| 3,280,984 | 10/1966 | Sexton et al. _____ 55—493 X |

HARRY B. THORNTON, *Primary Examiner.*

D. E. TALBERT, JR., *Assistant Examiner.*

U.S. Cl. X.R.

55—509, 511; 210—495